United States Patent
Pedrick

(10) Patent No.: US 7,498,929 B2
(45) Date of Patent: Mar. 3, 2009

(54) NUMERICAL DISPLAY MODULE FOR TRAIL VEHICLES

(76) Inventor: William Pedrick, 809 Hazel St., Elmira, NY (US) 14904

( * ) Notice: Subject to any disclaimer, the term of this patent is extended or adjusted under 35 U.S.C. 154(b) by 177 days.

(21) Appl. No.: 11/423,778

(22) Filed: Jun. 13, 2006

(65) Prior Publication Data

US 2007/0285220 A1    Dec. 13, 2007

(51) Int. Cl.
*B62J 3/00* (2006.01)
(52) U.S. Cl. ............ 340/432; 340/427; 340/901; 340/470
(58) Field of Classification Search ........... 340/468, 340/470, 472, 483, 488, 901, 471, 427, 432, 340/435
See application file for complete search history.

(56) References Cited

U.S. PATENT DOCUMENTS

| 5,886,627 | A | | 3/1999 | Brady et al. | |
|---|---|---|---|---|---|
| 5,905,434 | A | * | 5/1999 | Steffan et al. | 340/464 |
| 6,154,126 | A | * | 11/2000 | Beasley et al. | 340/468 |
| 6,553,285 | B1 | * | 4/2003 | Bahmad | 701/1 |
| 6,731,202 | B1 | * | 5/2004 | Klaus | 340/425.5 |
| 7,095,318 | B1 | * | 8/2006 | Bekhor | 340/485 |
| 7,142,104 | B1 | * | 11/2006 | Blueford | 340/472 |
| 7,289,019 | B1 | * | 10/2007 | Kertes | 340/435 |
| 2003/0142044 | A1 | * | 7/2003 | Berry | 345/55 |
| 2004/0239493 | A1 | * | 12/2004 | Miller | 340/471 |
| 2005/0200467 | A1 | * | 9/2005 | Au et al. | 340/465 |

* cited by examiner

*Primary Examiner*—Daniel Wu
*Assistant Examiner*—Edny Labbees
(74) *Attorney, Agent, or Firm*—Brown & Michaels, PC

(57) ABSTRACT

An apparatus and method are presented which are used by operators of trail vehicles to share information with each other about the number of vehicles in their group of trail users. A display module attached to a vehicle displays a number which indicates how many vehicles are in that vehicle's party. As oncoming trail users pass each other, they can read the value of the displayed numeral and know instantly how many vehicles to expect before the path is clear of traffic. The display module projects a number which is changeable, user determined, and has optical properties that allow the drivers of passing vehicles to readily convey information to each other.

6 Claims, 4 Drawing Sheets

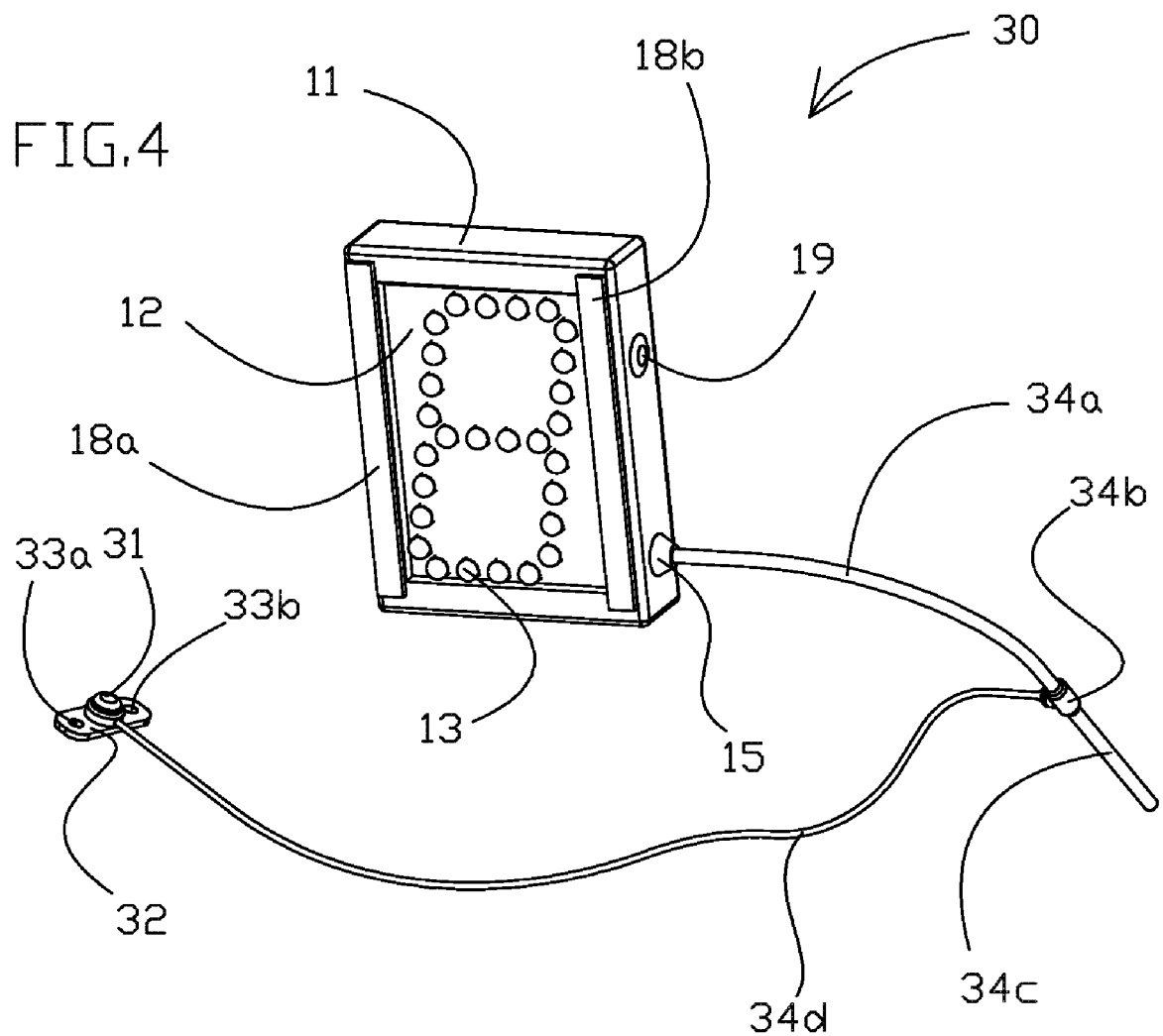

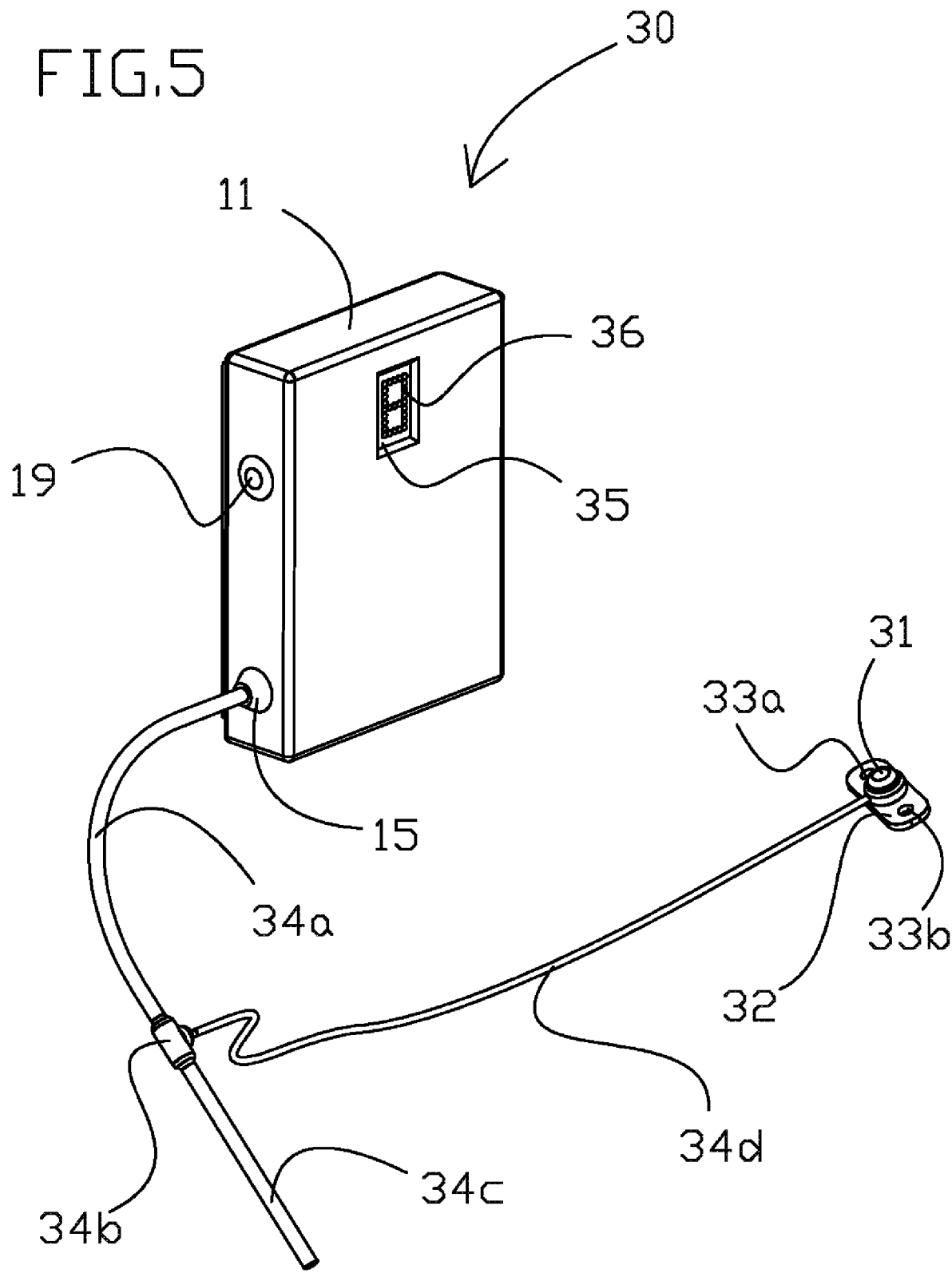

NUMERICAL DISPLAY MODULE FOR TRAIL VEHICLES

BACKGROUND OF THE INVENTION

1. Field of the Invention

The present invention relates most generally to visual display devices used to communicate information between vehicles. More particularly, the present invention relates to devices which may be used to signal between oncoming operators of vehicles that are traveling in opposite directions on a common trail in order to convey the number of vehicles that are traveling in each of the operators' respective parties.

2. Description of Related Art

The figures illustrate the apparatus and method of the present invention used in conjunction with snowmobiles. However, the present invention can be used with all types of trail vehicles. Therefore, for the purposes of this specification and the claims, the term "trail vehicle" incorporates all transportation means on a recreational trail, including but not limited to snowmobiles, all-terrain multi-wheeled vehicles, cyclists, skaters, and skiers. Additionally, reasonable analogies can be extended from the descriptions associated with the term "snowmobile" to other types of trail vehicles.

The general use of recreational trails is currently popular and growing in all parts of the world, particularly so in the United States and Canada. A substantial percentage of these trails are groomed and marked snowmobile trails that have been developed and maintained by snowmobile clubs working with local government and private land owners. There are at least 200,000 miles of groomed and marked snowmobile trails in North America. Increased popularity of snowmobile riding has created increased traffic on some of these trails. The increase in traffic has caused an increased danger of collisions between oncoming snowmobiles passing in opposite directions, especially on narrow trails with winding turns that create a limited line of sight.

The state of the art in snowmobile trail riding includes a loosely followed method or convention for signaling group size information from the operator of a snowmobile traveling in a first direction on a designated, confined snowmobile trail to the operator or operators of one or more oncoming snowmobiles traveling in a second, opposite direction on the trail. According to the current convention practiced by some typically more experienced riders, riders traveling in the first direction and riders traveling in the second direction signal the number of snowmobiles traveling behind them within their group by raising that number of fingers on one hand. The last rider in the group signals his status as the last rider by raising a closed fist. This convention has significant limitations and shortcomings. Hand gestures are frequently confused with a greeting hand wave. Even in those trail areas where hand gestures are well understood, riders often forget to perform the hand signal, or the riders are wearing mittens that do not permit individual finger signals, or the riders are unable to remove one hand from their handle bars or steering system because they might lose a level of control over their trail vehicle.

The invention presented by Brady et al. in U.S. Pat. No. 5,886,627, SIGNALING APPARATUS AND METHOD FOR TRAIL VEHICLES, issued Mar. 23, 1999, provided an apparatus and method that overcame some of the limitations of hand signaling. This signaling method included the use of user-selectable colored lights mounted on the trail vehicle in order to convey information to oncoming traffic about whether there are trailing party members or whether it is the last member of the party, depending on the color of light selected by the operator. For example, a yellow/amber light warns oncoming riders that additional members of the group are trailing, and a green light indicates that the snowmobile is the last of its party. This signaling method has limitations. First, the information presented by the use of colored lights is useful information only to those riders who understand the meaning of the color convention used by the signaling rider. Second, the colored lights used by Brady et al. do not present any information about how many trailing vehicles are within that operator's party the oncoming operator should expect to meet.

The present invention provides a signaling apparatus and method which are believed to substantially overcome some of the shortcomings of the known art because it includes a lighted numeral that readily conveys to oncoming trail users how many trail vehicles to expect before the path is clear of traffic.

SUMMARY OF THE INVENTION

The present invention provides an apparatus and method for signaling and conveying information from a signaling trail user traveling in one direction (first direction) on a trail to the one or more oncoming trail users traveling in the opposite direction (second direction) on the same trail. The information preferably pertains to traffic conditions present immediately behind the trail user traveling in the first direction. The information is particularly concerned with whether or not additional trail users are following the signaling trail user. In a preferred embodiment of the apparatus and the preferred mode of the process, a specific illuminated numeral stimulates the attention of the trail user traveling in the second direction and indicates the number of trail users which are following the trail user traveling in the first direction. The apparatus and process of this invention may also be used in conjunction with the common hand signal or other current warning conventions.

In a basic embodiment used on a snowmobile, the apparatus includes an illuminated numeral display disposed just behind the front transparent windshield of the snowmobile. The illuminated display is connected to an electrical power source on the snowmobile. The illuminated numeral projects forward and is visible to oncoming trail users. The numeral displayed in a preferred embodiment is an alphanumeric symbol that is yellow in color and with a projected intensity of light such that the number can be read by oncoming trail users traveling in the second direction even when the weather conditions are somewhat inclement. The numeral displayed is also large enough such that the number can be read even when the passing vehicles are traveling at relatively high rates of speed.

In a basic aspect, the method of signaling traffic on a recreation trail within a party of trail users includes steps to indicate the number of vehicles that are traveling within their party. Each member of the group traveling in the first direction adjusts the signaling device displayed on his vehicle to represent a number that is equal to the number of vehicles that are in his party who are traveling behind him. The last vehicle in the party traveling in the first direction adjusts the signaling device displayed on his vehicle to represent a number that is equal to zero, indicating that there are no more trailing members of the group.

Further refinements are incorporated into the functionality of a preferred embodiment of the present invention. A "blink mode" is activated by the user to make the displayed numeral blink on and off consecutively and repeatedly, thereby allowing the user to attract even more attention to the signaling device. In addition, a "dim mode" is activated by the user during night travel to make the brightness of the numeral illuminated to become dimmer, thereby easing the visibility of the numeral to oncoming traffic during night time use.

The features, benefits, and objects of this invention will become clear to those skilled in the art by reference to the following description, claims, and drawings.

BRIEF DESCRIPTION OF THE DRAWINGS

FIG. 4 is a front perspective view of a second embodiment of a signaling device of the present invention.

FIG. 5 is a rear perspective view of a second embodiment of a signaling device of the present invention.

DETAILED DESCRIPTION OF THE INVENTION

Figure 1:
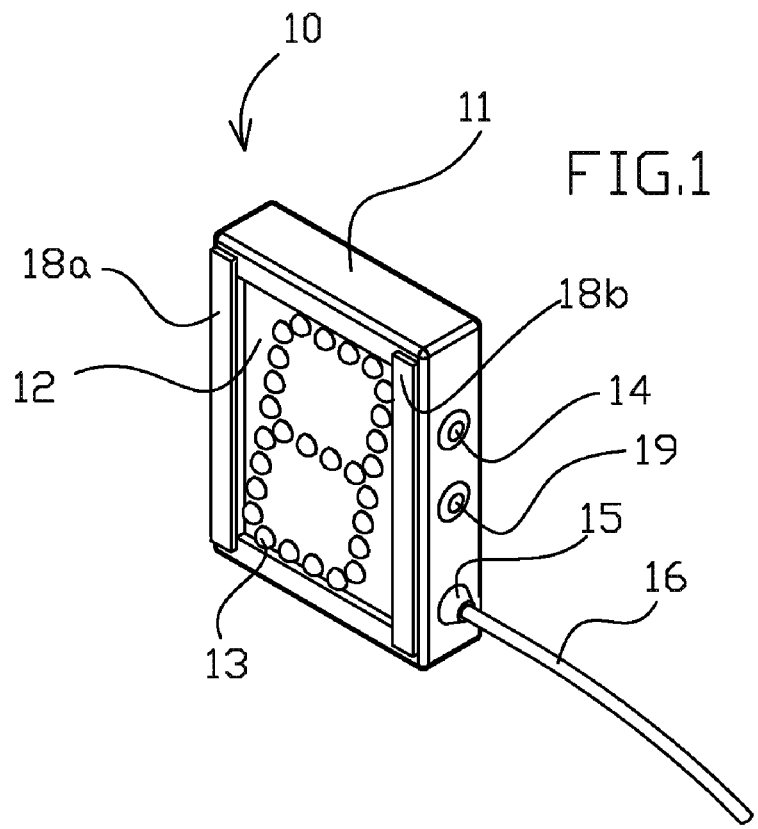
FIG. 1 is a front perspective view of a first embodiment of a signaling device of the present invention.
Figure 2:
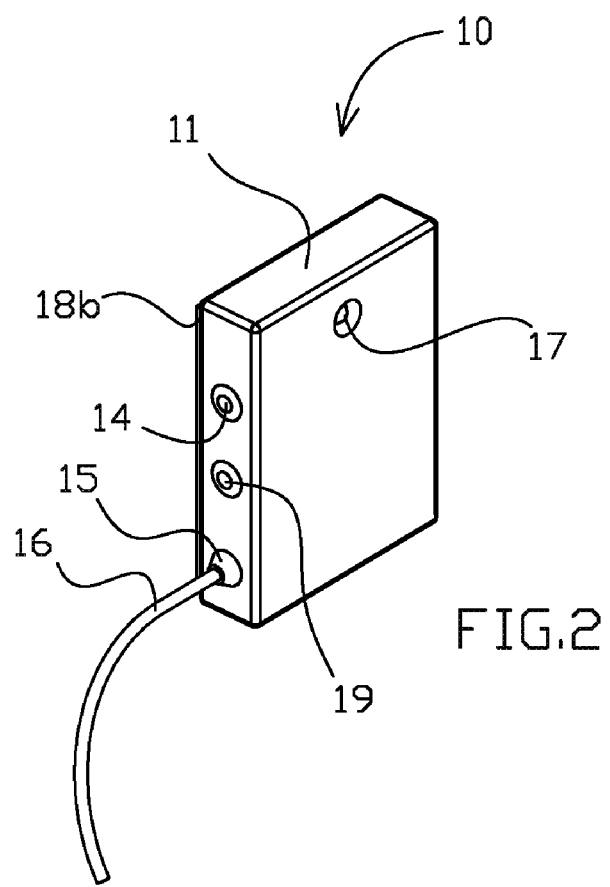
FIG. 2 is a rear perspective view of a first embodiment of a signaling device of the present invention.
Figure 3:
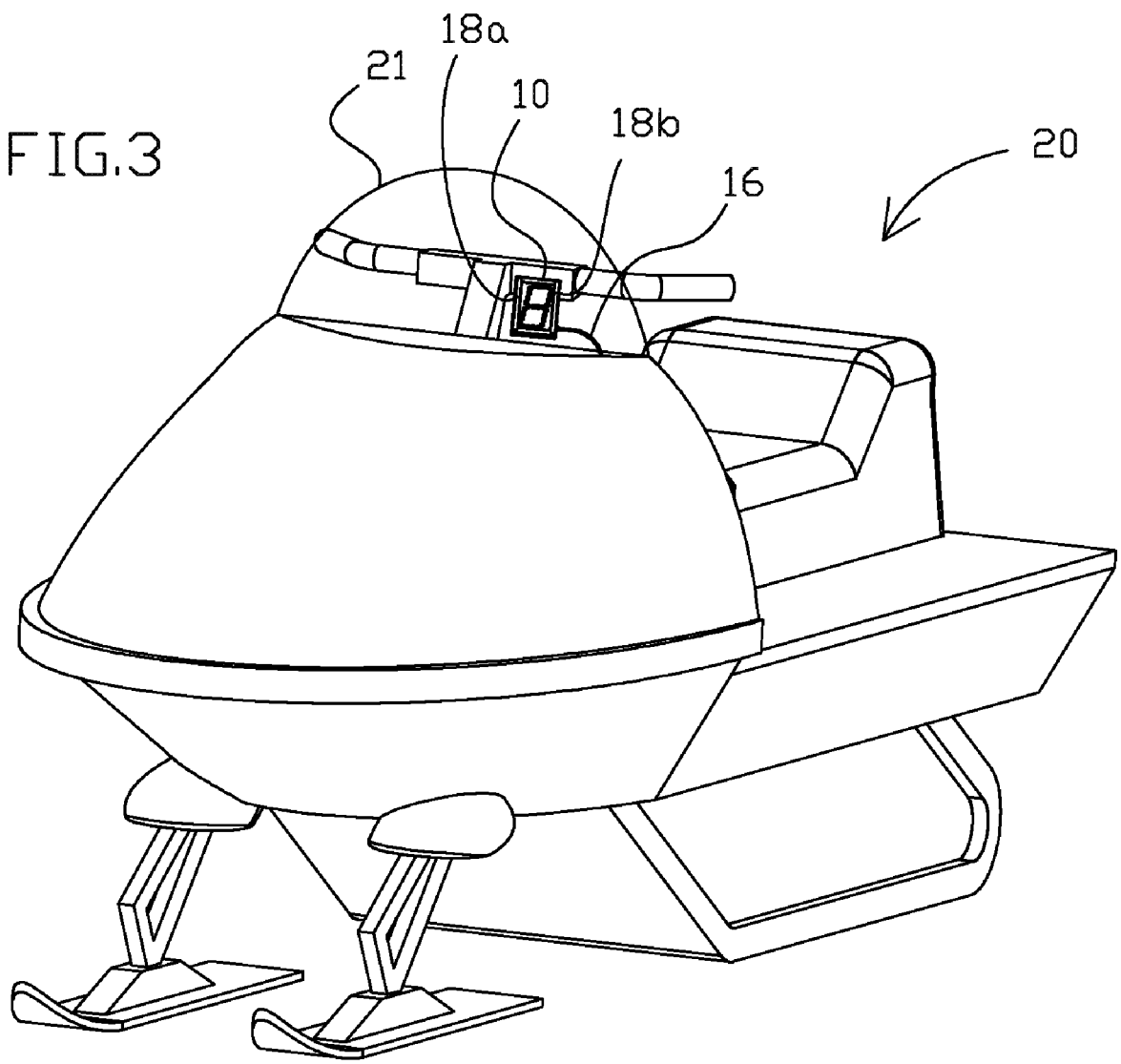
FIG. 3 is a perspective view of a snowmobile having a preferred embodiment of a signaling device of the present invention.

A preferred embodiment of a signaling device of the present invention is illustrated in FIGS. 1-2. FIG. 3 illustrates a snowmobile having a preferred embodiment of a signaling device of the present invention.

As previously noted, the signaling apparatus 10 can be used on different types of trail vehicles such as automobiles, all-terrain vehicles, and motorcycles. The signaling apparatus 10 is particularly desirable when used on snowmobiles 20 because they are often used to travel at high speeds on narrow trails with sharp bends and limited line of sight. The signaling apparatus 10 is useful in these conditions because operators of vehicles that are traveling in opposite directions on a common trail are informed of the number of vehicles that are traveling in each of the operators' respective parties. Each operator can steer their vehicle to the side of the trail until they know they have passed the last vehicle in the oncoming party of trail users.

In a preferred embodiment, the signaling apparatus 10 generally includes a case 11 in which a display face 12 is mounted. Integrated into the display face 12 is a light array 13 which is comprised of a plurality of light emitting diode (LED) lights that transmit visual information to oncoming trail users. An input selector button 14 allows the user to change the function of the apparatus 10 through internal circuitry. The construction of the internal circuitry is known to those skilled in the art of electric circuit design and fabrication. The input selector button 14 allows the user to engage the internal circuitry and change how the different lights in the light array 13 are energized and therefore transmit light. A cable 16 is attached to the case 11 through the grommet 15 which serves to seal the transition between the cable 16 and the case 11 to prevent ingress of any contaminants into case 11. Cable 16 consists of a protective casing and internal wires which transmit power to the signaling apparatus 10. The wires within cable 16 are attached to an auxiliary electric power source of snowmobile 20 in a manner known to those skilled in the art of vehicle power connections to provide proper voltage and power supply to the internal circuitry within signaling apparatus 10. A power indicator light 17 is in the side of case 11 that generally faces the operator of the snowmobile 20. The power indicator light 17 transmits light when energized through the internal circuitry within the case 11 to provide information to the operator of snowmobile 20. The power indicator light 17 is a light emitting device that indicates that the signaling apparatus 10 is receiving power and transmitting information from the light array 13, thereby indicating to the user whether the signaling apparatus 10 is functioning or whether it has been turned off. Mounting tapes 18a and 18b each have two adhesive faces that are used to mount the signaling apparatus 10 to the transparent windshield 21 of snowmobile 20.

The primary function of the signaling apparatus 10 is to convey visual information to oncoming trail users of the number of vehicles that are traveling in each of the operators' respective parties. Various individual lights within light array 13 are energized simultaneously by the internal circuitry of the signaling apparatus 10 in such a way to represent a specific number which is preferably one of the following: 0, 1, 2, 3, 4, 5, 6, 7, 8, or 9. In a preferred embodiment, the numbers displayed are Arabic, however, any type of numeric symbol may be used in the function of the signaling apparatus 10 so long as a numeral is easily and adequately conveyed to anyone looking at display face 12. The numbers are preferably yellow in color but may be any color that is legally permitted and easily visible to an oncoming vehicle. The input selector button 14 is used to change the number represented on the display face 12 by pressing the input selector button one time for each incremental change in number from 0 to 9. After reaching 9, the number preferably changes back to 0 if the input selector button 14 is pressed one more time. In an alternate embodiment, the signaling apparatus 10 also displays numbers higher than 9. The input selector button 14 is also used to power the signaling apparatus 10 into active or inactive states by pressing and holding the input selector button 14 down for some period of time much longer than that required to change the number displayed. For example, the internal circuitry in a preferred embodiment is designed to change the number if the input selector button 14 is held down for a length of time between 1 second and 5 seconds; if the input selector button 14 is held down for a length of time equal to 15 seconds or greater, then the signaling apparatus 10 is powered off. Once the signaling apparatus 10 is in the power-off state, if the input selector button 14 is held down for a length of time equal to 15 seconds or greater, then the signaling apparatus 10 is powered on.

An additional mode, called the "blink mode," is designed into the internal circuitry logic in a preferred embodiment of the present invention. In the blink mode, the number represented on the display face 12 repetitively changes from being energized to being de-energized continuously and repetitively, with the display lights 13 being energized for 1 second, and de-energized for one fourth of one second. The blink mode draws extra attention of anyone who may be in the visual line of sight of the signaling apparatus 10. In a preferred embodiment, if the input selector button 14 is held down for a length of time between 5 seconds and 15 seconds, then the signaling apparatus 10 enters blink mode. Once in blink mode, if the input selector button 14 is held down for a length of time between 5 seconds and 15 seconds, then the signaling apparatus 10 exits blink mode. The internal circuitry required to allow the signaling apparatus 10 to operate in blink mode is known to those skilled in the art of electric circuit design and fabrication.

An additional mode, called the "dim mode," is designed into the internal circuitry logic in a preferred embodiment of the present invention. In the dim mode, the illumination intensity or brightness of the display lights 13 is reduced, thereby providing more friendly viewing during night travel. In a preferred embodiment, the dim mode is activated by selecting the dim switch 19 on the side of case 11. Once the dim mode is activated, the user may then deactivate it by again selecting the dim switch 19 on the side of case 11. The internal circuitry required to allow the signaling apparatus 10 to operate in dim mode is known to those skilled in the art of electric circuit design and fabrication.

A memory feature is designed into the internal circuitry in a preferred embodiment of the present invention. After the signaling apparatus 10 has been de-energized, the last number displayed after power loss or shut-down is stored in the memory of the internal circuitry. When the signaling apparatus 10 is reenergized, this number is recalled back to the display face 12 if the signaling apparatus 10 has been de-energized for less than 20 minutes. The construction of the internal circuitry required to provide this memory feature is known to those skilled in the art of electric circuit design and fabrication.

In a preferred embodiment of the signaling apparatus 10, light emitting diode (LED) lights are used to fill the light array 13; however, a variety of different light emitting devices may be used to transmit visual information to oncoming trail users. For example, a plurality of conventional evacuated glass bulbs which house light emitting filaments may be used to construct the light array 13. However, LED lights are preferred because a relatively small amount of electrical power is required to energize them to deliver sufficiently high intensity of light emission. LED lights are also very durable and able to withstand the vibration and shock loads that the signaling apparatus 10 may experience when attached to a trail vehicle.

In a preferred embodiment of the signaling apparatus 10, power for the internal circuitry is provided through cable 16 which contains wires which are connected to the auxiliary power supply of snowmobile 20. However, other means of powering signaling apparatus 10 are possible. For example, internal batteries mounted within housing 11 or external to it may be used to supply the power for the internal circuitry of the signaling apparatus 10.

In a preferred embodiment of the signaling apparatus 10, adhesive tapes 18a and 18b which have two sides with adhesive properties are used to attach the signaling apparatus 10 to the side of transparent windshield 21 which is facing the operator using snowmobile 20. However, other means of mounting signaling apparatus 10 to snowmobile 20 are possible. For example, a simple clamping bracket may be used to clamp case 11 to the windshield 21 of snowmobile 20.

In a preferred embodiment of the signaling apparatus 10, the display face 12 includes an LED array 13 which is illuminated with electrical power in order to improve the ease with which the numeral displayed can be seen by oncoming trail users. However, a lower cost signaling apparatus 10 may be made in which the display face 12 displays a numeral passively (without electrical power) by means of reflective material or a material of the type in which the numeral is easily visible by oncoming trail users. This construction method is not as convenient, easy to use, nor as easily visible to oncoming traffic. However, it does allow a lower cost signaling apparatus 10 to be manufactured and for use by trail users who seek a lower cost signaling device.

FIGS. 4-5 illustrate a second embodiment of a signaling device of the present invention. This embodiment incorporates secondary features which are desirable to users but add to the cost of the signaling device 30.

The signaling apparatus 30 generally includes a case 11 in which a display face 12 is mounted. Preferably, mounting tapes 18a and 18b each having two adhesive faces are used to mount the signaling apparatus 30 to the transparent windshield 21 of snowmobile 20. Integrated into the display face 12 is a light array 13 which is comprised of a plurality of light emitting diode (LED) lights that transmit visual information to oncoming trail users. A cable 34a is attached to the case 11 through the grommet 15 which serves to seal the transition between the cable 34a and the case 11 to prevent ingress of any contaminants into case 11. Cable 34a consists of a protective casing and internal wires which transmit power and electric signals from switch 31 to the signaling apparatus 30. A cable junction 34b serves to join cable 34a with cable 34c and cable 34d. The wires within cable 34c are attached to an auxiliary electric power source of snowmobile 20 in a manner known to those skilled in the art of vehicle power connections to provide proper voltage and power supply to the internal circuitry within signaling apparatus 30. Cable 34d contains wires that are connected to an input selector button 31 which allows the user to change the function of the apparatus 30 through internal circuitry. The construction of the internal circuitry is known to those skilled in the art of electric circuit design and fabrication. The input selector button 31 allows the user to engage the internal circuitry of signaling device 30 in the same manner as input selector button 14 is used to engage the internal circuitry of signaling device 10. The input selector button 31 is preferably attached to a mount 32 having at least two mounting holes 33a, 33b for mounting the input selector button 31 to a surface of the snowmobile 20. In the second embodiment of the present invention, the dim mode is successively activated and deactivated by selected the dim switch 19 on the side of case 11 of signaling device 30.

In the second embodiment of the present invention, signaling device 30 includes a secondary display face 35 that is incorporated into the side of case 11 that generally faces the operator of the snowmobile 20. The secondary display face 35 includes a plurality of LED lights 36 which display an illuminated numeral when energized through the internal circuitry within the case 11 to provide information to the operator of snowmobile 20, including whether signaling apparatus 30 is receiving power and transmitting information from the light array 13, thereby indicating to the user whether the signaling apparatus 30 is functioning or whether it has been turned off, as well as the numeral which is being displayed on display face 12 of signaling device 30.

In another embodiment, the signaling apparatus includes at least one automated feature. In this embodiment, the signaling apparatuses for trail vehicles in a group each include a global positioning system (GPS) chip, a transmitter, and a receiver. Each signaling apparatus also includes a designation code. Each signaling apparatus is trained as to the other trail vehicles in the group. Once trained, the signaling apparatus detects its location with respect to the other signaling apparatuses of the group and automatically displays the correct numeral reflecting the number of trail vehicles of the group following the vehicle. The signaling apparatus preferably automatically updates the display numeral if the trail vehicle passes or is passed by another vehicle in the group. As an additional feature, the signaling apparatus detects oncoming vehicles not in the group having a GPS chip. The signaling apparatus warns the vehicle operator that at least one oncoming vehicle is approaching. The warning to alert the operator may include, but is not limited to, a blinking warning light visible to the operator.

The descriptions above and the accompanying drawings should be interpreted in the illustrative and not the limited sense. While the invention has been disclosed in connection with preferred embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of conveying trail traffic information to an oncoming trail vehicle for a group of trail vehicles comprising at least one signaling trail vehicle, the method comprising the steps of:
   a) providing a numeral; and
   b) displaying the numeral on a signaling apparatus mounted on the signaling trail vehicle, wherein the numeral represents a number of following trail vehicles, wherein the traffic information comprises the number of following trail vehicles, and wherein a following trail vehicle is a trail vehicle of the group of trail vehicles following the signaling trail vehicle.

2. The method of claim 1, wherein the signaling apparatus comprises an array of a plurality of light emitting diode (LED) lights for displaying the numeral.

3. The method of claim 1, wherein each trail vehicle of the group of trail vehicles is a signaling trail vehicle.

4. The method of claim 1, wherein the numeral is user changeable and user selectable.

5. The method of claim 1, wherein the numeral is automatically selected and changed using a global positioning system (GPS).

6. The method of claim 1, wherein the numeral is yellow in color.

* * * * *